(12) United States Patent
Deng et al.

(10) Patent No.: US 11,519,405 B2
(45) Date of Patent: Dec. 6, 2022

(54) VALVE SPRING SEAT SLEEVE, VALVE ASSEMBLY AND PLUNGER PUMP

(71) Applicant: YANTAI JEREH PETROLEUM EQUIPMENT & TECHNOLOGIES CO., LTD., Shandong (CN)

(72) Inventors: Wenjie Deng, Shandong (CN); Baoguo Jian, Shandong (CN); Weichen Liu, Shandong (CN); Haiping Cui, Shandong (CN); Peng Li, Shandong (CN); Jixin Wang, Shandong (CN)

(73) Assignee: YANTAI JEREH PETROLEUM EQUIPMENT & TECHNOLOGIES CO., LTD., Shandong (CN)

( * ) Notice: Subject to any disclaimer, the term of this patent is extended or adjusted under 35 U.S.C. 154(b) by 0 days.

(21) Appl. No.: 17/375,233

(22) Filed: Jul. 14, 2021

(65) Prior Publication Data
US 2022/0341415 A1   Oct. 27, 2022

(30) Foreign Application Priority Data
Apr. 21, 2021  (CN) .......................... 202110430556.4

(51) Int. Cl.
*F04B 53/16* (2006.01)
*F04B 53/10* (2006.01)
*F16K 17/04* (2006.01)

(52) U.S. Cl.
CPC ...... *F04B 53/1072* (2013.01); *F04B 53/1087* (2013.01); *F16K 17/0413* (2013.01)

(58) Field of Classification Search
CPC .............. F04B 53/1072; F04B 53/1087; F16K 17/0413
See application file for complete search history.

(56) References Cited

U.S. PATENT DOCUMENTS

| 2018/0058444 | A1* | 3/2018 | Blume | .................... F04B 53/16 |
| 2019/0072089 | A1* | 3/2019 | Buckley | ................ F04B 1/0461 |
| 2019/0154033 | A1* | 5/2019 | Brooks | ................. F16K 15/026 |

FOREIGN PATENT DOCUMENTS

| CN | 203114605 U | 8/2013 |
| CN | 204239229 U | 4/2015 |
| CN | 205990989 U | 3/2017 |
| CN | 111692065 A | 9/2020 |
| CN | 215517318 U | 9/2020 |
| CN | 212202451 U | 12/2020 |

\* cited by examiner

*Primary Examiner* — P. Macade Nichols
(74) *Attorney, Agent, or Firm* — Volpe Koenig

(57) ABSTRACT

A valve spring seat sleeve, a valve assembly, and a plunger pump are disclosed. The valve spring seat sleeve includes a cylindrical hollow structure, a first fluid hole, a first notch and a second notch; the cylindrical hollow structure includes a plunger passage; the first fluid hole passes through a sidewall of the cylindrical hollow structure and communicated with the plunger passage; the first notch and the second notch are located on a side of the cylindrical hollow structure opposite to the first fluid hole; the cylindrical hollow structure includes a first end portion, a second end portion and an intermediate portion, a center of the first fluid hole is located at the intermediate portion, the cylindrical hollow structure further includes a spring mounting portion located between the first notch and the second notch.

16 Claims, 4 Drawing Sheets

VALVE SPRING SEAT SLEEVE, VALVE ASSEMBLY AND PLUNGER PUMP

The present application claims the priority of Chinese patent application No. 202110430556.4 filed on Apr. 21, 2021, for all purposes, the disclosure of which is incorporated herein by reference in its entirety as part of the present application.

TECHNICAL FIELD

Embodiments of the present disclosure relate to a valve spring seat sleeve, a valve assembly and a plunger pump.

BACKGROUND

In the field of oil and gas exploitation, fracturing technology is a method to make oil and gas reservoirs crack by using high-pressure fracturing fluid. Fracturing technology can improve the flowing environment of oil and gas underground by causing cracks in oil and gas reservoirs, which can increase the output of oil wells, therefore, it is widely used in conventional and unconventional oil and gas exploitation, offshore and onshore oil and gas resources development.

Plunger pump is a device that uses the reciprocating motion of a plunger in a cylinder to pressurize liquid. Plunger pump has the advantages of high rated pressure, compact structure and high efficiency, so it is used in fracturing technology.

SUMMARY

The embodiments of the present disclosure provide a valve spring seat sleeve, a valve assembly and a plunger pump. The installation and disassembly process of the valve spring seat sleeve is convenient, and there is no need to arrange a groove in the chamber, so that the stress concentration can be reduced and the service life of the valve box can be prolonged; on the other hand, the valve spring seat sleeve can provide a more stable fixing effect for the spring, and can also avoid rotation in the chamber, thereby improving the performance of the valve assembly.

At least one embodiment of the present disclosure provides a valve spring seat sleeve, which includes: a cylindrical hollow structure including a plunger passage located in the cylindrical hollow structure; a first fluid hole passing through a sidewall of the cylindrical hollow structure and communicated with the plunger passage; a first notch located on a side of the cylindrical hollow structure opposite to the first fluid hole; and a second notch located on the side of the cylindrical hollow structure opposite to the first fluid hole, the cylindrical hollow structure includes a first end portion, a second end portion and an intermediate portion between the first end portion and the second end portion, a center of the first fluid hole is located at the intermediate portion, the first notch is located at the first end portion, the second notch is located at the second end portion, the cylindrical hollow structure further includes a spring mounting portion located between the first notch and the second notch.

For example, in the valve spring seat sleeve provided by an embodiment of the present disclosure, the first notch is located at the first end portion and recessed from an edge of the first end portion to the intermediate portion, and the second notch is located at the second end portion and recessed from an edge of the second end portion to the intermediate portion.

For example, in the valve spring seat sleeve provided by an embodiment of the present disclosure, the spring mounting portion includes a U-shaped groove, the U-shaped groove is recessed from a bottom of the first notch to the second notch, and the U-shaped groove is configured to mount a spring seat.

For example, in the valve spring seat sleeve provided by an embodiment of the present disclosure, a surface of the spring mounting portion away from the plunger passage includes a mounting surface, and a cut surface of the spring mounting portion cut by the U-shaped groove is an inclined surface, and an included angle between the inclined surface and the mounting surface is less than 90 degrees.

For example, in the valve spring seat sleeve provided by an embodiment of the present disclosure, the included angle between the inclined surface and the mounting surface is less than 80 degrees.

For example, in the valve spring seat sleeve provided by an embodiment of the present disclosure, the first fluid hole is opposite to the spring mounting portion.

For example, the valve spring seat sleeve provided by an embodiment of the present disclosure further includes: a first boss arranged on an outer surface of the cylindrical hollow structure and along an edge of the first end portion; a second boss arranged on an outer surface of the cylindrical hollow structure and along an edge of the second end portion; and a third boss arranged on an outer surface of the cylindrical hollow structure and located between the first boss and the second boss, and disconnected at a position where the first fluid hole is located.

At least one embodiment of the present disclosure further provides a valve assembly, which includes: the abovementioned valve spring seat sleeve; a spring seat mounted on the spring mounting portion; and a spring mounted on the spring seat.

For example, in the valve assembly provided by an embodiment of the present disclosure, the spring mounting portion includes a U-shaped groove, the U-shaped groove is recessed from the first notch to the second notch, and the spring seat includes: a spring seat body; a first mounting portion located at a side of the spring seat body and detachably connected with the U-shaped groove; and a second mounting portion located at a side of the spring seat body away from the first mounting portion, in a second direction perpendicular to the first direction from the first mounting portion to the second mounting portion, a size of the second mounting portion is smaller than a size of the spring seat body to form a boss structure with the spring seat body, and the boss structure is configured to be detachably connected with the spring.

For example, in the valve assembly provided by an embodiment of the present disclosure, a surface of the spring mounting portion away from the plunger passage includes a mounting surface, a cut surface of the spring mounting portion cut by the U-shaped groove is an inclined surface, and an included angle between the inclined surface and the mounting surface is less than 90 degrees, the spring seat body is in contact with the mounting surface, the first mounting portion includes a cone-shaped structure, a size of a part of the cone-shaped structure close to the spring seat body is smaller than that of a part of the cone-shaped structure away from the spring seat body to form a conical surface, and the conical surface is in contact with the inclined surface to mount the spring seat body on the spring mounting portion.

For example, in the valve assembly provided by an embodiment of the present disclosure, the spring seat includes: a second fluid hole passing through the first mounting portion, the spring seat body and the second mounting portion.

For example, the valve assembly provided by an embodiment of the present disclosure further includes: a valve body including a valve main body portion, and a spring connecting portion and a guiding portion which are respectively arranged at two sides of the valve main body portion; and a valve seat located at a side of the valve body away from the valve spring seat sleeve and including an intermediate hole; the spring connecting portion is connected with the spring, the guiding portion is located in the intermediate hole, and the valve main body portion is configured to move close to or away from the valve seat to open or close the intermediate hole.

At least one embodiment of the present disclosure further provides a plunger pump, which includes a hydraulic end, the hydraulic end including: a valve box including a plunger chamber and a fluid chamber inside the valve box; and a plunger located in the plunger chamber and configured to reciprocate along the plunger chamber; and the abovementioned valve assembly, the plunger chamber and the fluid chamber cross each other and form an alternating chamber at a crossing position, and the valve spring seat sleeve is arranged at the alternating chamber, a first axis of the plunger passage is parallel to a second axis of the plunger, and a size of the plunger passage in a direction perpendicular to the first axis is greater than or equal to a size of the plunger in a direction perpendicular to the second axis to allow the plunger to pass through.

For example, in the plunger pump provided by an embodiment of the present disclosure, the fluid chamber includes a third end portion and a fourth end portion which are oppositely arranged in an axial direction of the fluid chamber, and the spring and the spring seat are located on a side of the valve spring seat sleeve close to the third end portion.

For example, the plunger pump provided by an embodiment of the present disclosure, further includes: a cover located at a side of the valve spring seat sleeve; and a nut located at a side of the cover away from the valve spring seat sleeve, a part of the alternating chamber away from the cover includes a boss surface, the first end portion of the valve spring seat sleeve is in contact with the boss surface, and the cover is in contact with the second end portion of the valve spring seat sleeve and configured to press the valve spring seat sleeve under a pressure from the nut.

For example, the plunger pump provided by an embodiment of the present disclosure, further including: a power end connected with the plunger and configured to drive the plunger to reciprocate.

BRIEF DESCRIPTION OF THE DRAWINGS

In order to more clearly illustrate the technical solutions of the embodiments of the disclosure, the drawings of the embodiments will be briefly described in the following; it is obvious that the described drawings below are only related to some embodiments of the disclosure and thus are not limitative to the disclosure.

DETAILED DESCRIPTION

In order to make objectives, technical details and advantages of the embodiments of the present disclosure more clearly, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment (s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "include," "including," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

In the plunger pump, the valve assembly is an important assembly. The valve assembly usually includes a valve spring seat, a spring, a valve body and a valve seat. The valve spring seat is arranged in a chamber, the spring is arranged on the valve spring seat, one end of the valve body is in contact with the spring, and the other end of the valve body is in contact with the valve seat. Under the elastic force of the spring, the valve body can seal an intermediate hole of the valve seat, so as to achieving closing the valve assembly; upon the force exerted by the fluid on the valve body in the direction from the valve seat to the valve spring seat being greater than the elastic force of the spring, the valve body is separated from the valve seat or partially separated, so that the intermediate hole of the valve seat cannot be sealed, thus achieving opening the valve assembly. On the other hand, upon the fluid exerting a force on the valve body from the valve spring seat to the valve seat, the valve body still seals the intermediate hole of the valve seat. Therefore, the valve assembly is also a one-way valve.

Figure 1:
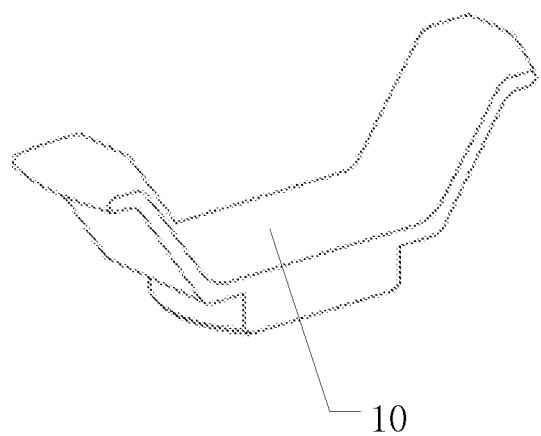
FIG. 1 is a schematic diagram of a valve spring seat.
Figure 2:
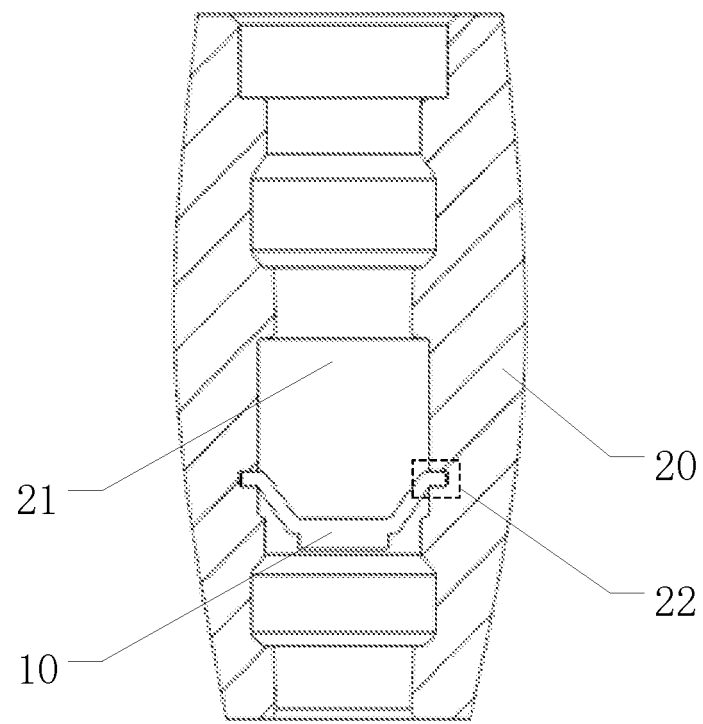
FIG. 2 is a schematic assembly diagram of a valve spring seat.

FIG. 1 is a schematic diagram of a valve spring seat; FIG. 2 is a schematic assembly diagram of a valve spring seat. As illustrated in FIG. 1 and FIG. 2, in the mounting process of the valve spring seat 10, it is needed to accurately align the valve spring seat 10 with the spring, resulting in inconvenient installation. Secondly, it is needed to set an annular groove 22 in the chamber 21 inside the valve box 20 to fix the position of the valve spring seat 10, and the position where the annular groove 22 is located is easy to produce large stress concentration, which easily leads to the rupture of the valve box 20 and reduces the service life of the valve box 20. In addition, during the use process of the valve spring seat 10, the valve spring seat 10 is easy to rotate in the annular groove 22, resulting in poor spring fixing effect.

Therefore, the embodiments of the present disclosure provide a valve spring seat sleeve, a valve assembly and a plunger pump. The valve spring seat sleeve includes a cylindrical hollow structure, a first fluid hole, a first notch and a second notch. The cylindrical hollow structure includes a plunger passage located in the cylindrical hollow structure. The first fluid hole passes through a sidewall of the cylindrical hollow structure and is communicated with the plunger passage. The first notch is located on a side of the cylindrical hollow structure opposite to the first fluid hole. The second notch is located on the side of the cylindrical hollow structure opposite to the first fluid hole. The cylindrical hollow structure includes a first end portion, a second end portion and an intermediate portion between the first end portion and second end portion. Therefore, on the one hand, the installation and disassembly process of the valve spring seat sleeve is convenient, and there is no need to arrange a groove in the chamber, so that the stress concentration can be reduced and the service life of the valve box can be prolonged; on the other hand, the valve spring seat sleeve can provide a more stable fixing effect for the spring, and can also avoid rotation in the chamber, thereby improving the performance of the valve assembly.

Hereinafter, the valve spring seat sleeve, the valve assembly and the plunger pump provided by the embodiments of the present disclosure will be described in detail with reference to the accompanying drawings.

Figure 3:
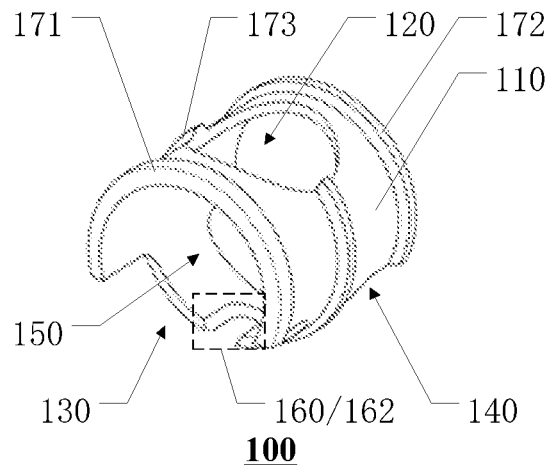
FIG. 3 is a structural schematic diagram of a valve spring seat sleeve according to an embodiment of the present disclosure.
Figure 4:
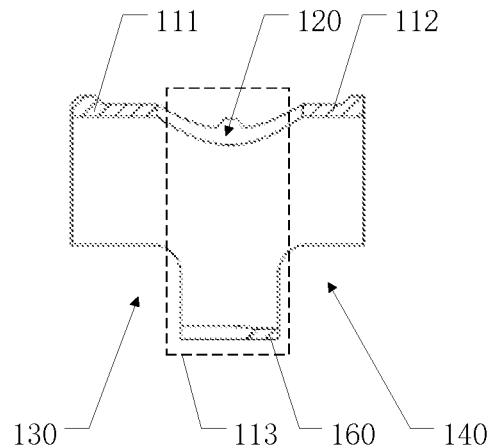
FIG. 4 is a sectional view of a valve spring seat sleeve according to an embodiment of the present disclosure.
Figure 5:
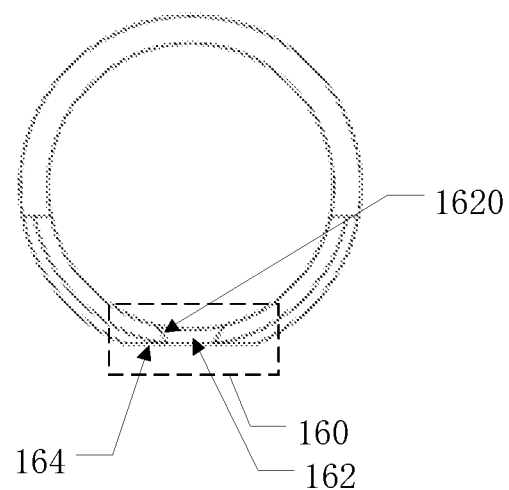
FIG. 5 is a side view of a valve spring seat sleeve according to an embodiment of the present disclosure.

An embodiment of the present disclosure provides a valve spring seat sleeve. FIG. 3 is a structural schematic diagram of a valve spring seat sleeve according to an embodiment of the present disclosure; FIG. 4 is a sectional view of a valve spring seat sleeve according to an embodiment of the present disclosure; FIG. 5 is a side view of a valve spring seat sleeve according to an embodiment of the present disclosure.

As illustrated in FIGS. 3 and 4, the valve spring seat sleeve 100 includes a cylindrical hollow structure 110, a first fluid hole 120, a first notch 130 and a second notch 140. The cylindrical hollow structure 110 includes a plunger passage 150 located in the cylindrical hollow structure 110, and the plunger passage 150 is configured to allow a plunger to pass through, so its radial size should be greater than or equal to a radial size of the plunger. The first fluid hole 120 passes through the sidewall of the cylindrical hollow structure 110 and is communicated with the plunger passage 150. The first notch 130 is located on a side of the cylindrical hollow structure 110 opposite to the first fluid hole 120. The second notch 140 is located on the side of the cylindrical hollow structure 110 opposite to the first fluid hole 120. Therefore, fluid can enter the plunger passage 150 from the first notch 130 and the second notch 140 and flow out from the first fluid hole 120. It should be noted that the above-mentioned "first notch" and "second notch" refer to the missing or removed part of the cylindrical hollow structure.

As illustrated in FIGS. 3 and 4, the cylindrical hollow structure 110 includes a first end portion 111, a second end portion 112 and an intermediate portion 113 between the first end portion 111 and the second end portion 112. The first end portion 111, the intermediate portion 113 and the second end portion 112 are arranged in sequence in the extending direction of the cylindrical hollow structure 110. The center of the first fluid hole 120 is located at the intermediate portion 113, the first notch 130 is located at the first end portion 111, the second notch 140 is located at the second end portion 112, and the cylindrical hollow structure 110 further includes a spring mounting portion 160 located between the first notch 130 and the second notch 140.

In the valve spring seat sleeve provided by the embodiment of the present disclosure, the spring mounting portion can be used for mounting and fixing the spring, and fluid can enter the plunger passage from the first notch and the second notch on two sides of the spring mounting portion and flow out from the first fluid hole. The cylindrical hollow structure does not need to be fixed by arranging a groove in the inner chamber of the valve box, thus reducing stress concentration and prolonging the service life of the valve box. On the other hand, the valve spring seat sleeve will not rotate in the chamber inside the valve box, so it can provide a more stable fixing effect for the spring, thus improving the performance of the valve assembly.

In some examples, as illustrated in FIGS. 3 and 4, the first notch 130 is located at the first end portion 111 and recessed from an edge of the first end portion 111 to the intermediate portion 113, and the second notch 140 is located at the second end portion 112 and recessed from an edge of the second end portion 112 to the intermediate portion 113. Therefore, on the one hand, the first notch 130 and the second notch 140 are convenient for manufacturing; on the other hand, the first notch 130 and the second notch 140 have larger areas, so that the flow rate of fluid passing through the valve spring seat sleeve can be increased.

Of course, the embodiments of the present disclosure include but are not limited thereto. The first notch can also be located at a side of the edge of the first end portion close to the intermediate portion, that is, the first notch is surrounded by the edge of the first end portion and the intermediate portion, and in this case, the first notch can have a closed shape. Similarly, the second notch can also be located at a side of the edge of the second end portion close to the intermediate portion, that is, the second notch is surrounded by the edge of the second end portion and the intermediate portion, and in this case, the second notch can have a closed shape.

In some examples, as illustrated in FIGS. 3 and 4, the first fluid hole 120 is arranged opposite to the spring mounting portion 160. Therefore, both the first fluid hole and the spring mounting portion are roughly located in the intermediate portion, so that the stress condition of the valve spring seat sleeve can be optimized, and the strength of the valve spring seat sleeve can be improved.

In some examples, as illustrated in FIGS. 3 and 4, the valve spring seat sleeve further includes: a first boss 171, arranged on an outer surface of the cylindrical hollow structure 110 and along an edge of the first end portion 111; a second boss 172, arranged on an outer surface of the cylindrical hollow structure 110 and along an edge of the second end portion 112; and a third boss 173, arranged on an outer surface of the cylindrical hollow structure 110 and located between the first boss 171 and the second boss 172, and disconnected at the position where the first fluid hole 120 is located. Therefore, the first boss 171, the second boss 172 and the third boss 173 can increase the structural strength of the cylindrical hollow structure 110 without affecting the passage of the plunger.

In some examples, as illustrated in FIGS. 3 and 4, the spring mounting portion 160 includes a U-shaped groove 162, the U-shaped groove 162 is recessed from the bottom of the first notch 130 to the second notch 140, and the U-shaped groove 162 is configured to mount the spring seat. Therefore, the U-shaped groove 162 can mount the spring seat in a clamping manner without precise alignment, thereby reducing the difficulty of mounting and dismounting. For example, the spring seat can be slid into the U-shaped groove from the open end of the U-shaped groove to fix the U-shaped groove with the spring seat. For example, the bottom of the notch refers to a part close to the intermediate portion of the cylindrical hollow structure.

In some examples, as illustrated in FIG. 5, a surface of the spring mounting portion 160 away from the plunger passage 150 includes a mounting surface 164, and a cut surface of the spring mounting portion 160 cut by the U-shaped groove 162 is an inclined surface 1620, and the included angle between the inclined surface 1620 and the mounting surface 164 is less than 90 degrees, so that upon the spring seat includes an inclined surface or a conical surface, the spring seat can be fixed in the U-shaped groove.

In some examples, as illustrated in FIG. 5, the included angle between the inclined surface 1620 and the mounting surface 164 is less than 80 degrees.

Figure 6:
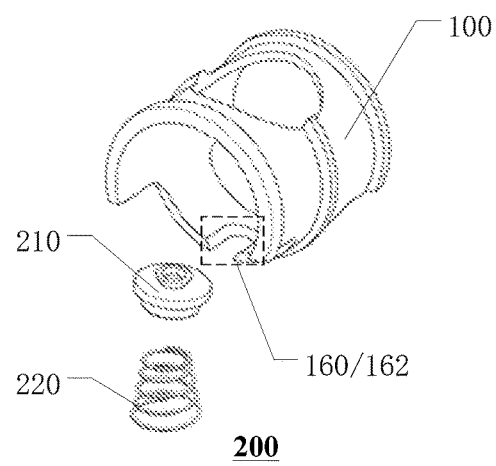
FIG. 6 is a schematic diagram of a valve assembly according to an embodiment of the present disclosure.
Figure 7:
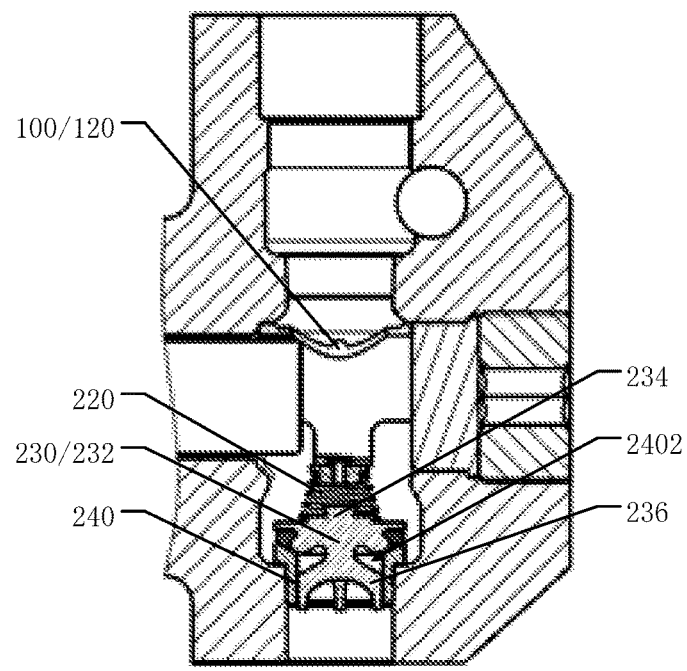
FIG. 7 is a partial schematic diagram of a valve assembly mounted on a hydraulic end according to an embodiment of the present disclosure.

An embodiment of the present disclosure further provides a valve assembly. FIG. 6 is a schematic diagram of a valve assembly provided by an embodiment of the present disclosure; FIG. 7 is a partial schematic diagram of a valve assembly mounted on a hydraulic end according to an embodiment of the present disclosure. As illustrated in FIGS. 6 and 7, the valve assembly 200 includes the valve spring seat sleeve 100, the spring seat 210 and the spring 220 provided by any of the above examples. The spring seat 210 is mounted on the spring mounting portion 160. The spring 220 is mounted on the spring seat 210.

In the valve assembly provided by the embodiment of the present disclosure, the spring seat can fix the spring on the spring mounting portion, and fluid can enter the plunger passage from the first notch and the second notch on two sides of the spring mounting portion and flow out from the first fluid hole. The cylindrical hollow structure does not need to be fixed by arranging a groove in the inner chamber of the valve box, thus reducing stress concentration and prolonging the service life of the valve box. On the other hand, the valve spring seat sleeve will not rotate in the chamber inside the valve box, so it can provide a more stable fixing effect for the spring, thus improving the performance of the valve assembly.

In some examples, as illustrated in FIG. 7, the valve assembly 200 further includes a valve body 230 and a valve seat 240. The valve body 230 includes a valve main body portion 232, and a spring connecting portion 234 and a guiding portion 236 respectively arranged at two sides of the valve main body portion 232. The valve seat 240 is located on a side of the valve body 230 away from the valve spring seat sleeve 100 and includes an intermediate hole 2402. The spring connecting portion 234 is connected with the spring 220, the guiding portion 236 is located in the intermediate hole 2402, and the valve main body portion 232 is configured to move close to or away from the valve seat 240 to open or close the intermediate hole 2402, thereby achieving the opening or closing of the valve assembly 200.

In some examples, as illustrated in FIG. 7, under the elastic force of the spring 220, the valve body 230 can seal the intermediate hole 2402 of the valve seat 240 to close the valve assembly 200. Upon the force exerted by the fluid on the valve body 230 in the direction from the valve seat 240 to the valve spring seat sleeve 100 being greater than the elastic force of the spring 220, the valve body 230 is separated or partially separated from the valve seat 240, so that the intermediate hole 2402 of the valve seat 240 cannot be sealed, thereby realizing the opening of the valve assembly 200. On the other hand, upon the fluid exerting a force on the valve body 230 in the direction from the valve spring seat sleeve 100 to the valve seat 240, the valve body 230 still seals the intermediate hole 2402 of the valve seat 240. Therefore, the valve assembly 200 can achieve a one-way valve.

Figure 8:
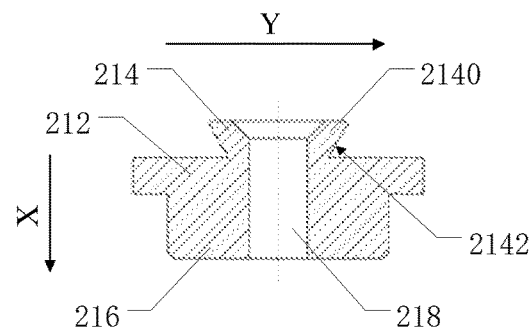
FIG. 8 is a schematic sectional view of a spring seat according to an embodiment of the present disclosure.

FIG. 8 is a schematic sectional view of a spring seat according to an embodiment of the present disclosure. As illustrated in FIGS. 6 and 8, the spring mounting portion 160 includes a U-shaped groove 162, the U-shaped groove 162 is recessed from the bottom of the first notch 130 to the second notch 140. The spring seat 210 includes: a spring beat body 212; a first mounting portion 214, located at a side of the spring seat body 212 and detachably connected with the U-shaped groove 162; and a second mounting portion 216, located on a side of the spring seat body 212 away from the first mounting portion 214. In a second direction Y perpendicular to the first direction X from the first mounting portion 214 to the second mounting portion 216, the size of the second mounting portion 216 is smaller than the size of the spring seat body 212 to form a boss structure with the spring seat body 212, and the boss structure is configured to be detachably connected with the spring. Therefore, the boss structure can conveniently mount the spring.

In some examples, as illustrated in FIGS. 6 and 8, a surface of the spring mounting portion 160 away from the plunger passage 150 includes a mounting surface 164, a cut surface of the spring mounting portion 160 cut by the U-shaped groove 162 is an inclined surface 1620, the included angle between the inclined surface 1620 and the mounting surface 164 is less than 90 degrees, the spring seat body 212 is in contact with the mounting surface 164, and the first mounting portion 214 includes a cone-shaped structure 2140. The size of a part of the cone-shaped structure 2140 close to the spring seat body 212 is smaller in size than that of a part of the cone-shaped structure 2140 away from the spring seat body 212 to form a conical surface 2142, the conical surface 2142 is in contact with the inclined surface 1620 to mount the spring seat body 212 on the spring mounting portion 160.

In some examples, as illustrated in FIG. 8, the spring seat 210 includes a second fluid hole 218 passing through the first mounting portion 214, the spring seat body 212 and the second mounting portion 216. Therefore, the fluid can also enter the plunger passage 150 through the second fluid hole 218 and then flow out from the first fluid hole 120.

Figure 9:
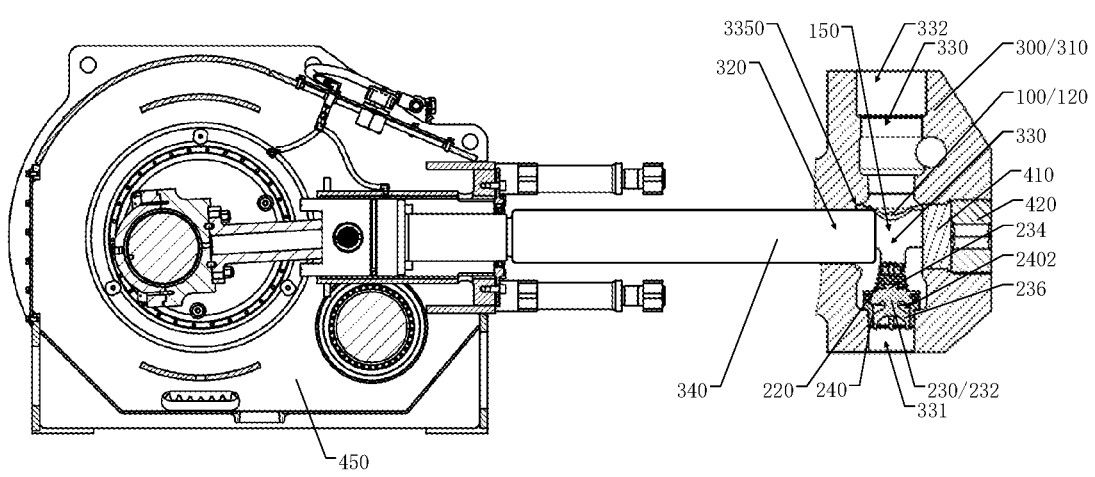
FIG. 9 is a schematic structural diagram of a plunger pump according to an embodiment of the present disclosure.

An embodiment of the present disclosure further provides a plunger pump. FIG. 9 is a schematic structural diagram of a plunger pump according to an embodiment of the present disclosure. As illustrated in FIG. 9, the plunger pump 400 includes a hydraulic end 300, the hydraulic end 300 includes a valve box 310, a plunger 340 and the valve assembly 200 provided by any of the above examples. The valve box 310 includes a plunger chamber 320 and a fluid chamber 330 located inside the valve box 310. The plunger 340 is located in the plunger chamber 320 and configured to reciprocate along the plunger chamber 320.

As illustrated in FIG. 9, the plunger chamber 320 and the fluid chamber 330 cross each other and form an alternating chamber 335 at the crossing position. The valve spring seat sleeve 100 is arranged at the alternating chamber 335. A first axis of the plunger passage 150 is parallel to a second axis of the plunger 340. The size of the plunger passage 150 in the direction perpendicular to the first axis is greater than or equal to the size of the plunger 340 in the direction perpendicular to the second axis, so as to allow the plunger 340 to pass through.

In the plunger pump provided by the embodiment of the present disclosure, because the valve spring seat sleeve does not need to be fixed by arranging a groove in the inner chamber of the valve box, stress concentration can be reduced, and the service life of the valve box can be prolonged, thereby prolonging the service life of the plunger pump and reducing the maintenance cost of the plunger pump. On the other hand, the valve spring seat sleeve will not rotate in the chamber inside the valve box, so it can provide a more stable fixing effect for the spring, thus improving the performance of the plunger pump.

For example, the case where the first axis of plunger passage 150 is parallel to the second axis of plunger 340 includes the case where the first axis of plunger passage 150 coincides with the second axis of plunger 340.

In some examples, as illustrated in FIG. 9, the fluid chamber 330 includes a third end portion 331 and a fourth end portion 332 which are oppositely arranged in the axial direction of the fluid chamber 330, and the spring 220 and the spring seat 210 are located on a side of the valve spring seat sleeve 100 close to the third end portion 310.

In some examples, as illustrated in FIG. 9, the plunger pump 400 further includes: a cover 410, located at a side of the valve spring seat sleeve 100; and a nut 420, located at a side of the cover 410 away from the valve spring seat sleeve 100. A part of the alternating chamber 335 away from the cover 410 includes a boss surface 3350, the first end portion 111 of the valve spring seat sleeve 100 is in contact with the boss surface 3350, and the cover 410 is in contact with the second end portion 112 of the valve spring seat sleeve 100 and configured to press the valve spring seat sleeve 100 under the pressure from the nut 420. Therefore, the plunger pump can press and fix the valve spring seat sleeve through the cover and nut.

In some examples, as illustrated in FIG. 9, the plunger pump further includes a power end 450. The power end 450 is connected with the plunger 340 and configured to drive the plunger 340 to reciprocate, thereby pressurizing the fluid in the valve box 310.

For example, the above-mentioned power end can adopt a crank-connecting rod mechanism to drive the plunger to reciprocate. Of course, the embodiments of the present disclosure include but are not limited thereto, and the power end can also adopt other ways to drive the plunger to reciprocate.

The following statements need to be explained:

(1) In the drawings of the embodiments of the present disclosure, only the structures related to the embodiments of the present disclosure are involved, and other structures may refer to the common design(s);

(2) In case of no conflict, features in one embodiment or in different embodiments of the present disclosure can be combined.

The above are merely particular embodiments of the present disclosure but are not limitative to the scope of the present disclosure; any of those skilled familiar with the related arts can easily conceive variations and substitutions in the technical scopes disclosed in the present disclosure, which should be encompassed in protection scopes of the present disclosure. Therefore, the scopes of the present disclosure should be defined in the appended claims.

The invention claimed is:

1. A valve spring seat sleeve, comprising:
   a cylindrical hollow structure comprising a plunger passage located in the cylindrical hollow structure;
   a first fluid hole passing through a sidewall of the cylindrical hollow structure and communicated with the plunger passage;
   a first notch located on a side of the cylindrical hollow structure opposite to the first fluid hole; and
   a second notch located on the side of the cylindrical hollow structure opposite to the first fluid hole,
   wherein the cylindrical hollow structure comprises a first end portion, a second end portion and an intermediate portion between the first end portion and the second end portion, a center of the first fluid hole is located at the intermediate portion, the first notch is located at the first end portion, the second notch is located at the second end portion, the cylindrical hollow structure further comprises a spring mounting portion located between the first notch and the second notch.

2. The valve spring seat sleeve according to claim 1, wherein the first notch is located at the first end portion and recessed from an edge of the first end portion to the intermediate portion, and the second notch is located at the second end portion and recessed from an edge of the second end portion to the intermediate portion.

3. The valve spring seat sleeve according to claim 1, wherein the spring mounting portion comprises a U-shaped groove, the U-shaped groove is recessed from a bottom of the first notch to the second notch, and the U-shaped groove is configured to mount a spring seat.

4. The valve spring seat sleeve according to claim 3, wherein a surface of the spring mounting portion away from the plunger passage comprises a mounting surface, and a cut surface of the spring mounting portion cut by the U-shaped groove is an inclined surface, and an included angle between the inclined surface and the mounting surface is less than 90 degrees.

5. The valve spring seat sleeve according to claim 4, wherein the included angle between the inclined surface and the mounting surface is less than 80 degrees.

6. The valve spring seat sleeve according to claim 1, wherein the first fluid hole is opposite to the spring mounting portion.

7. The valve spring seat sleeve according to claim 1, further comprising:
   a first boss arranged on an outer surface of the cylindrical hollow structure and along an edge of the first end portion;
   a second boss arranged on an outer surface of the cylindrical hollow structure and along an edge of the second end portion; and
   a third boss arranged on an outer surface of the cylindrical hollow structure and located between the first boss and the second boss, and disconnected at a position where the first fluid hole is located.

8. A valve assembly, comprising:
   the valve spring seat sleeve according to claim 1;
   a spring seat mounted on the spring mounting portion; and
   a spring mounted on the spring seat.

9. The valve assembly according to claim 8, wherein the spring mounting portion comprises a U-shaped groove, the U-shaped groove is recessed from the first notch to the second notch, and the spring seat comprises:
   a spring seat body;

a first mounting portion located at a side of the spring seat body and detachably connected with the U-shaped groove; and a second mounting portion located at a side of the spring seat body away from the first mounting portion, wherein, in a second direction perpendicular to the first direction from the first mounting portion to the second mounting portion, a size of the second mounting portion is smaller than a size of the spring seat body to form a boss structure with the spring seat body, and the boss structure is configured to be detachably connected with the spring.

10. The valve assembly according to claim 9, wherein a surface of the spring mounting portion away from the plunger passage comprises a mounting surface, a cut surface of the spring mounting portion cut by the U-shaped groove is an inclined surface, and an included angle between the inclined surface and the mounting surface is less than 90 degrees, the spring seat body is in contact with the mounting surface, the first mounting portion comprises a cone-shaped structure, a size of a part of the cone-shaped structure close to the spring seat body is smaller than that of a part of the cone-shaped structure away from the spring seat body to form a conical surface, and the conical surface is in contact with the inclined surface to mount the spring seat body on the spring mounting portion.

11. The valve assembly according to claim 9, wherein the spring seat comprises:

a second fluid hole passing through the first mounting portion, the spring seat body and the second mounting portion.

12. The valve assembly according to claim 8, further comprising:

a valve body comprising a valve main body portion, and a spring connecting portion and a guiding portion which are respectively arranged at two sides of the valve main body portion; and a valve seat located at a side of the valve body away from the valve spring seat sleeve and comprising an intermediate hole;

wherein the spring connecting portion is connected with the spring, the guiding portion is located in the intermediate hole, and the valve main body portion is configured to move close to or away from the valve seat to open or close the intermediate hole.

13. A plunger pump comprising a hydraulic end, the hydraulic end comprising:

a valve box comprising a plunger chamber and a fluid chamber inside the valve box; and a plunger located in the plunger chamber and configured to reciprocate along the plunger chamber; and the valve assembly according to claim 8, wherein the plunger chamber and the fluid chamber cross each other and form an alternating chamber at a crossing position, and the valve spring seat sleeve is arranged at the alternating chamber, a first axis of the plunger passage is parallel to a second axis of the plunger, and a size of the plunger passage in a direction perpendicular to the first axis is greater than or equal to a size of the plunger in a direction perpendicular to the second axis to allow the plunger to pass through.

14. The plunger pump according to claim 13, wherein the fluid chamber comprises a third end portion and a fourth end portion which are oppositely arranged in an axial direction of the fluid chamber, and the spring and the spring seat are located on a side of the valve spring seat sleeve close to the third end portion.

15. The plunger pump according to claim 13, further comprising:

a cover located at a side of the valve spring seat sleeve; and a nut located at a side of the cover away from the valve spring seat sleeve, wherein a part of the alternating chamber away from the cover comprises a boss surface, the first end portion of the valve spring seat sleeve is in contact with the boss surface, and the cover is in contact with the second end portion of the valve spring seat sleeve and configured to press the valve spring seat sleeve under a pressure from the nut.

16. The plunger pump according to claim 13, further comprising:

a power end connected with the plunger and configured to drive the plunger to reciprocate.

* * * * *